US008907800B2

(12) United States Patent
Namekawa et al.

(10) Patent No.: US 8,907,800 B2
(45) Date of Patent: Dec. 9, 2014

(54) ELECTRONIC APPARATUS AND METHOD OF CONTROLLING ELECTRONIC APPARATUS

(75) Inventors: Kimiyasu Namekawa, Tokyo (JP); Hiroyuki Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 922 days.

(21) Appl. No.: 13/008,548

(22) Filed: Jan. 18, 2011

(65) Prior Publication Data

US 2011/0205071 A1    Aug. 25, 2011

(30) Foreign Application Priority Data

Feb. 24, 2010   (JP) ................. 2010-039183

(51) Int. Cl.
*G08B 17/00*   (2006.01)
*G01K 7/42*    (2006.01)
*G06F 1/20*    (2006.01)

(52) U.S. Cl.
CPC ............. *G06F 1/206* (2013.01); *G01K 7/425* (2013.01); *G01K 2207/00* (2013.01); *Y02B 60/1275* (2013.01); *G01K 7/42* (2013.01)
USPC ............ 340/588; 361/15; 361/93.8; 361/103; 219/494; 702/130

(58) Field of Classification Search
CPC ........... G08B 17/06; G01K 3/04; G01K 7/42; G01K 7/425; G01K 2207/00; Y02B 60/1275; G06F 1/206; G06K 19/0717
USPC ............ 340/500, 540, 584, 888, 588, 589, 340/636.18; 702/130; 396/97; 361/103; 219/494
See application file for complete search history.

(56) References Cited

U.S. PATENT DOCUMENTS

| 4,193,025 | A   | * | 3/1980  | Frailing et al. ............... 324/427 |
| 4,832,491 | A   | * | 5/1989  | Sharpe et al. ................. 356/326 |
| 5,412,448 | A   | * | 5/1995  | Kunishige ...................... 396/97 |
| 5,548,201 | A   | * | 8/1996  | Grabon ......................... 320/150 |
| 5,805,767 | A   | * | 9/1998  | Jouas et al. ................... 392/373 |
| 5,973,602 | A   | * | 10/1999 | Cole et al. .................... 340/584 |
| 6,611,774 | B1  | * | 8/2003  | Zaccaria ........................ 702/63 |
| 6,768,420 | B2  | * | 7/2004  | McCarthy et al. ......... 340/573.1 |
| 6,826,361 | B1  | * | 11/2004 | Yost ............................... 396/97 |
| 7,063,171 | B2  | * | 6/2006  | Totsu ............................ 173/181 |
| 7,381,486 | B2  | * | 6/2008  | Sakakida et al. ............. 429/429 |

(Continued)

FOREIGN PATENT DOCUMENTS

JP   2008-271571   11/2008

*Primary Examiner* — James Yang
*Assistant Examiner* — An T Nguyen
(74) *Attorney, Agent, or Firm* — Sony Corporation

(57) ABSTRACT

An electronic apparatus includes: a temperature measurement section that measures a temperature of a heat generation source generating heat by consuming power or a temperature of an inner position of a casing of which the temperature changes due to the heat generation of the heat generation source; and an environmental temperature calculation section that calculates a temperature which is calculated using a predetermined relational equation that is different in accordance with a model from a difference between a first temperature measured by the temperature measurement section at a point in time when the heat generation source starts consuming a predetermined amount of power and a second temperature measured by the temperature measurement section at a point in time after the passage of a predetermined period from the start of consumption of a predetermined amount of power by the heat generation source as an environmental temperature in an environment where the casing is placed.

10 Claims, 11 Drawing Sheets

(56) References Cited

U.S. PATENT DOCUMENTS

| | | | |
|---|---|---|---|
| 7,726,782 B2 * | 6/2010 | Tsuchikawa | 347/60 |
| 7,818,133 B2 * | 10/2010 | Furuse | 702/51 |
| 7,820,949 B2 * | 10/2010 | Sasaki et al. | 219/497 |
| 7,825,978 B2 * | 11/2010 | Ito et al. | 348/333.01 |
| 8,301,051 B2 * | 10/2012 | Ogiso et al. | 399/69 |
| 8,392,027 B2 * | 3/2013 | Hollaway | 700/282 |
| 8,555,775 B2 * | 10/2013 | Nicolai | 99/281 |
| 2002/0166659 A1 * | 11/2002 | Wagner et al. | 165/254 |
| 2002/0171986 A1 * | 11/2002 | Figueroa et al. | 361/93.1 |
| 2002/0180610 A1 * | 12/2002 | Pedoeem et al. | 340/635 |
| 2003/0005754 A1 * | 1/2003 | Schule | 73/61.76 |
| 2003/0016498 A1 * | 1/2003 | Kurokawa et al. | 361/699 |
| 2004/0102914 A1 * | 5/2004 | More | 702/99 |
| 2005/0260008 A1 * | 11/2005 | Tatematsu et al. | 399/70 |
| 2007/0058280 A1 * | 3/2007 | Wada et al. | 360/75 |
| 2011/0119018 A1 * | 5/2011 | Skarp | 702/130 |
| 2011/0191059 A1 * | 8/2011 | Farrell et al. | 702/130 |
| 2011/0205071 A1 * | 8/2011 | Namekawa et al. | 340/588 |
| 2013/0037533 A1 * | 2/2013 | Namekawa et al. | 219/494 |

\* cited by examiner

ELECTRONIC APPARATUS AND METHOD OF CONTROLLING ELECTRONIC APPARATUS

BACKGROUND OF THE INVENTION

1. Field of the Invention

The present invention relates to an electronic apparatus and a method of controlling the electronic apparatus, and more particularly, to a portable electronic apparatus such as a digital camera, a portable phone, or a portable audio player, and a method of controlling such an electronic apparatus.

2. Description of the Related Art

In portable electronic apparatuses such as a digital video camera, a digital still camera, a portable phone, or a portable audio player, it is very important to realize both enhanced performance and size-reduction in order to meet the user's demands. Moreover, with the progress of size-reduction, products in which separate apparatuses are integrated with each other are being commercialized. An example of such products is one in which a digital still camera, a portable audio player, and a portable phone are integrated with each other.

However, enhancement of the performance of electronic apparatuses means an increase in the amount of data processed by an internal IC, which results in an increase in the amount of heat generation of the IC. When the increased temperature exceeds a performance guaranteeing temperature of a device, various problems may occur. For example, when an imaging device such as a CCD (Charge Coupled Device) image sensor or a CMOS (Complementary Metal Oxide Semiconductor) image sensor becomes hot, a problem that noise increases occurs.

Therefore, it is necessary to effectively dissipate the heat generated in the IC, and various attempts have been made. For example, an invention related to a heat dissipation structure capable of effectively releasing heat generated inside a digital camera to the outside to suppress a temperature increase inside the digital camera is also known (for example, see JP-A-2008-271571).

SUMMARY OF THE INVENTION

In order to dissipate heat generated by the internal heat generation source of a portable electronic apparatus, a structure which releases the generated heat to the casing of the electronic apparatus can be used. However, when the temperature of the casing becomes too high, the user may feel discomfort or receive a low temperature burn. Therefore, it may be desirable to take measures such as to stop the operation of the electronic apparatus when the temperature of the internal heat generation source of the electronic apparatus reaches a predetermined temperature.

However, the discomfort experienced by the user results from the temperature of the casing relative to the use environment of the electronic apparatus rather than from the absolute temperature of the casing. However, providing the electronic apparatus with a means for directly measuring the temperature in the use environment of the electronic apparatus has a problem in that it results in an increase in the cost of the electronic apparatus.

It is therefore desirable to provide a new or improved electronic apparatus and a method of controlling an electronic apparatus capable of calculating an environmental temperature by measuring the temperature at places where the temperature changes are the result of the heat generation of a heat generation source.

According to an embodiment of the present invention, there is provided an electronic apparatus including: a temperature measurement section that measures a temperature of a heat generation source generating heat by consuming power or a temperature of an inner position of a casing of which the temperature changes due to the heat generation of the heat generation source; and an environmental temperature calculation section that calculates a temperature which is calculated using a predetermined relational equation that is different in accordance with a model from a difference between a first temperature measured by the temperature measurement section at a point in time when the heat generation source starts consuming a predetermined amount of power and a second temperature measured by the temperature measurement section at a point in time after the passage of a predetermined period from the start of consumption of a predetermined amount of power by the heat generation source as an environmental temperature in an environment where the casing is placed.

The environmental temperature calculation section may hold a third temperature measured by the temperature measurement section at a point in time when the electronic apparatus is turned on, select the lower temperature of the third temperature and the temperature calculated using the predetermined relational equation from the difference between the first temperature and the second temperature, and use the selected temperature as the environmental temperature.

The electronic apparatus may further include an operation control section that outputs a warning signal when the difference between the environmental temperature calculated by the environmental temperature calculation section and the temperature measured by the temperature measurement section exceeds a predetermined first value.

The operation control section may stop the supply of power to the heat generation source when the difference between the environmental temperature calculated by the environmental temperature calculation section and the temperature measured by the temperature measurement section exceeds a predetermined second value greater than the first value.

The temperature measurement section may be provided directly to the heat generation source.

The temperature measurement section may be provided on a substrate which is provided in contact with the heat generation source so as to drive the heat generation source.

The heat generation source may be an imaging device.

According to another embodiment of the present invention, there is provided a method of controlling an electronic apparatus, including the steps of: measuring a first temperature of a heat generation source generating heat by consuming power or a temperature of an inner portion of a casing of which the temperature changes due to the heat generation of the heat generation source at a point in time when the heat generation source starts consuming a predetermined amount of power; measuring a second temperature of the heat generation source or the inner portion of the casing at a point in time after the passage of a predetermined period from the start of consumption of a predetermined amount of power by the heat generation source; and calculating a temperature which is calculated using a predetermined relational equation that is different in accordance with a model from a difference between the first temperature and the second temperature as an environmental temperature in an environment where the casing is placed.

The method of controlling the electronic apparatus may further include measuring a third temperature of the heat generation source or the inner portion of the casing at a point in time when the electronic apparatus is turned on, and in the step of calculating the environmental temperature, the lower temperature of the third temperature and the temperature calculated using the predetermined relational equation from the difference between the first temperature and the second temperature may be selected, and the selected temperature may be used as the environmental temperature.

The method of controlling the electronic apparatus may further include outputting a warning signal when the difference between the environmental temperature and the temperature of the heat generation source or the inner portion of the casing exceeds a predetermined first value.

In the step of outputting the warning signal, when the difference between the environmental temperature and the temperature of the heat generation source or the inner portion of the casing exceeds a predetermined second value greater than the first value, the supply of power to the heat generation source may be stopped.

As described above, according to the embodiments of the present invention, it is possible to provide a new or improved electronic apparatus and a method of controlling an electronic apparatus capable of calculating an environmental temperature by measuring the temperature at places where the temperature changes resulting from the heat generation of a heat generation source.

DESCRIPTION OF THE PREFERRED EMBODIMENTS

Figure 1:
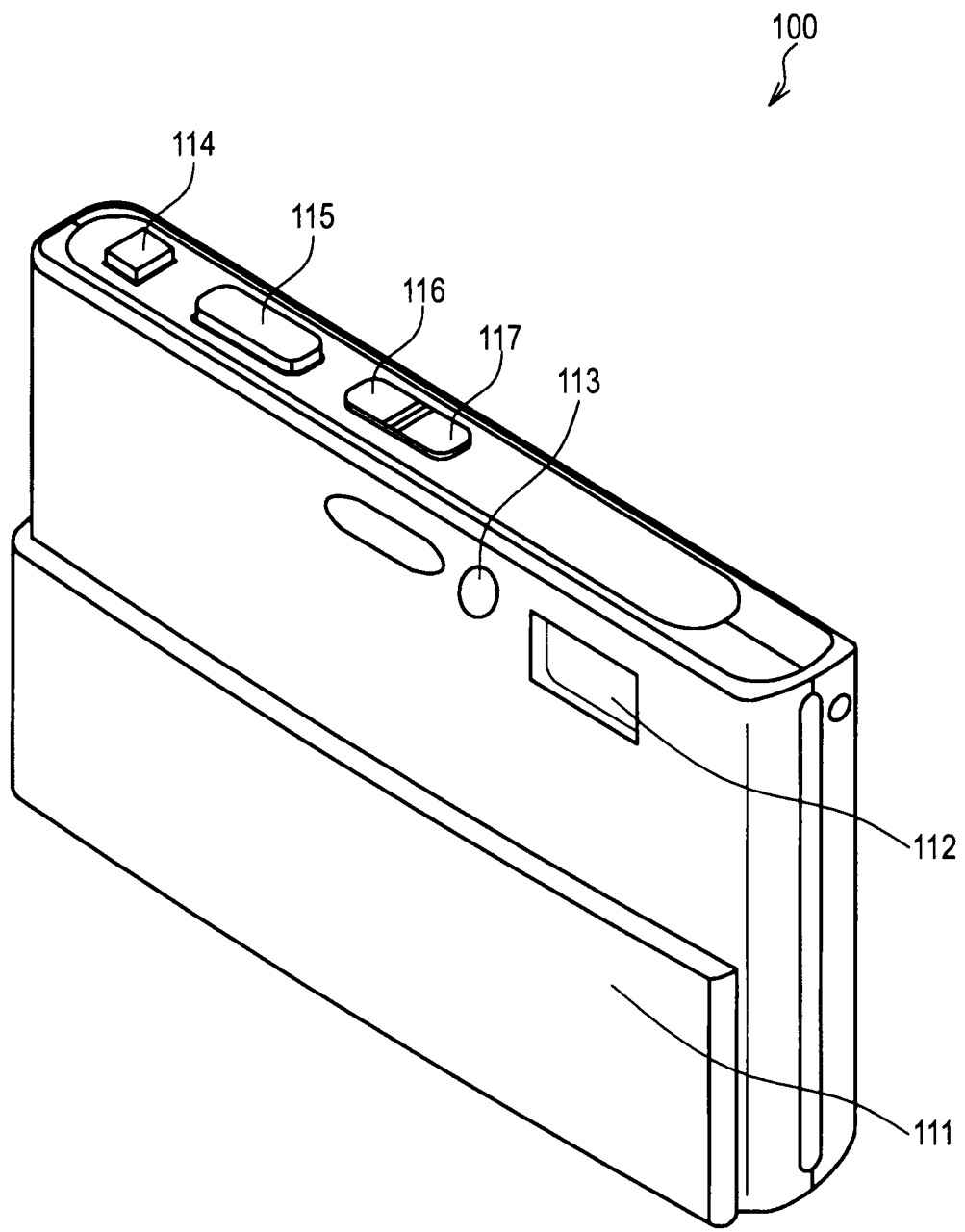
FIG. 1 is a diagram showing an exterior appearance of an imaging apparatus according to an embodiment of the present invention and is a perspective view from the front of the imaging apparatus.

Hereinafter, preferred embodiments of the present invention will be described in detail with reference to the accompanying drawings. In this specification and the drawings, the same reference numerals refer to the constituent elements having substantially the same functional configuration, and redundant description thereof will be omitted.

The description will be given in the following order.
<1. Embodiment of Present Invention>
 [1-1. Exterior Appearance Example of Imaging Apparatus]
 [1-2. Functional Configuration of Imaging Apparatus]
 [1-3. Heat Dissipation Structure of Imaging Apparatus]
 [1-4. Calculation Method of Environmental Temperature]
 [1-5. Temperature Monitoring Operation of CMOS Image Sensor]
<2. Conclusion>

Figure 2:
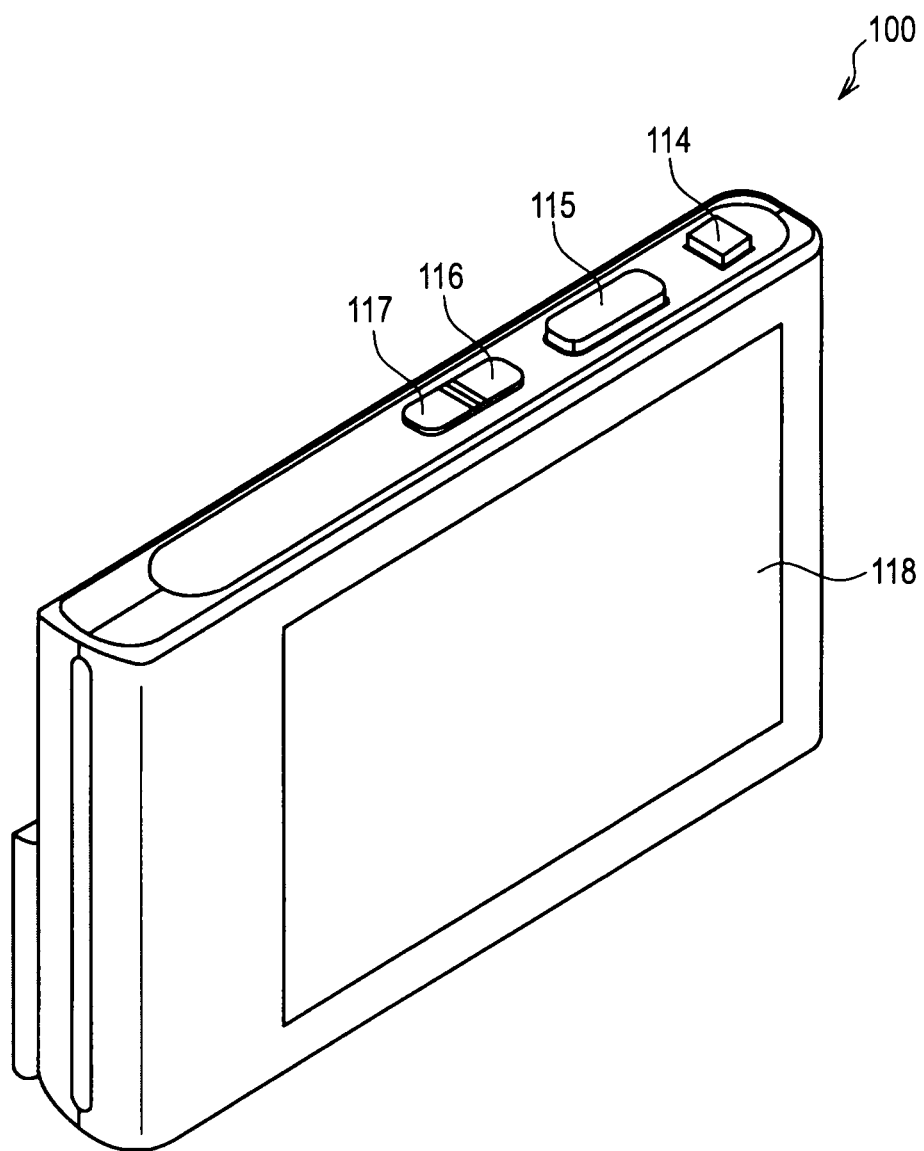
FIG. 2 is a diagram showing an exterior appearance of the imaging apparatus according to the embodiment of the present invention and is a perspective view from the back of the imaging apparatus.

1. Embodiment of Present Invention 1-1. Exterior Appearance Example of Imaging Apparatus First, an exterior appearance example of an imaging apparatus which is an example of an electronic apparatus of the present invention will be described with reference to the drawings. FIG. 1 is a diagram showing an exterior appearance of an imaging apparatus 100 according to an embodiment of the present invention and is a perspective view from the front of the imaging apparatus 100. FIG. 2 is a diagram showing an exterior appearance of the imaging apparatus 100 according to the embodiment of the present invention and is a perspective view from the back of the imaging apparatus 100.

The imaging apparatus 100 according to the embodiment of the present invention shown in FIGS. 1 and 2 has a configuration in which a casing 110 for accommodating circuits, components, and the like is further covered with a sliding lens cover 111. An imaging lens 112 and an AF illuminator 113 are disposed on the front surface of the imaging apparatus 100 so that they are exposed when the lens cover 111 on the front surface is slid down and opened. The AF illuminator 113 also serves as a self-timer lamp. Moreover, a display section 118 which is configured, for example, by a liquid crystal panel or an organic EL panel is provided on the back surface of the imaging apparatus 100 so as to occupy most of the back surface.

Moreover, on the upper surface of the imaging apparatus 100, a zoom lever (TELE/WIDE) 114 for changing an imaging magnification at the time of imaging, a shutter button 115 for starting the capturing of a still image or a moving image, a playback button 116 for displaying captured data stored in the imaging apparatus 100 on the display section 118, and a power button 117 for turning on/off the imaging apparatus 100 are disposed.

In the imaging apparatus 100 according to the embodiment of the present invention, light collected by the imaging lens 112 is irradiated onto an imaging device such as a CCD image sensor or a CMOS image sensor, and the imaging device converts the light into electrical signals to obtain the captured data. Moreover, the imaging apparatus 100 according to the embodiment of the present invention has a structure which releases heat of the imaging device generated with the imaging operation to the casing 110. The heat dissipation structure of the imaging device will be described later.

Hereinabove, the exterior appearance of the imaging apparatus 100 according to the embodiment of the present invention has been described. Next, a functional configuration of the imaging apparatus 100 according to the embodiment of the present invention will be described.

1-2. Functional Configuration of Imaging Apparatus

Figure 3:
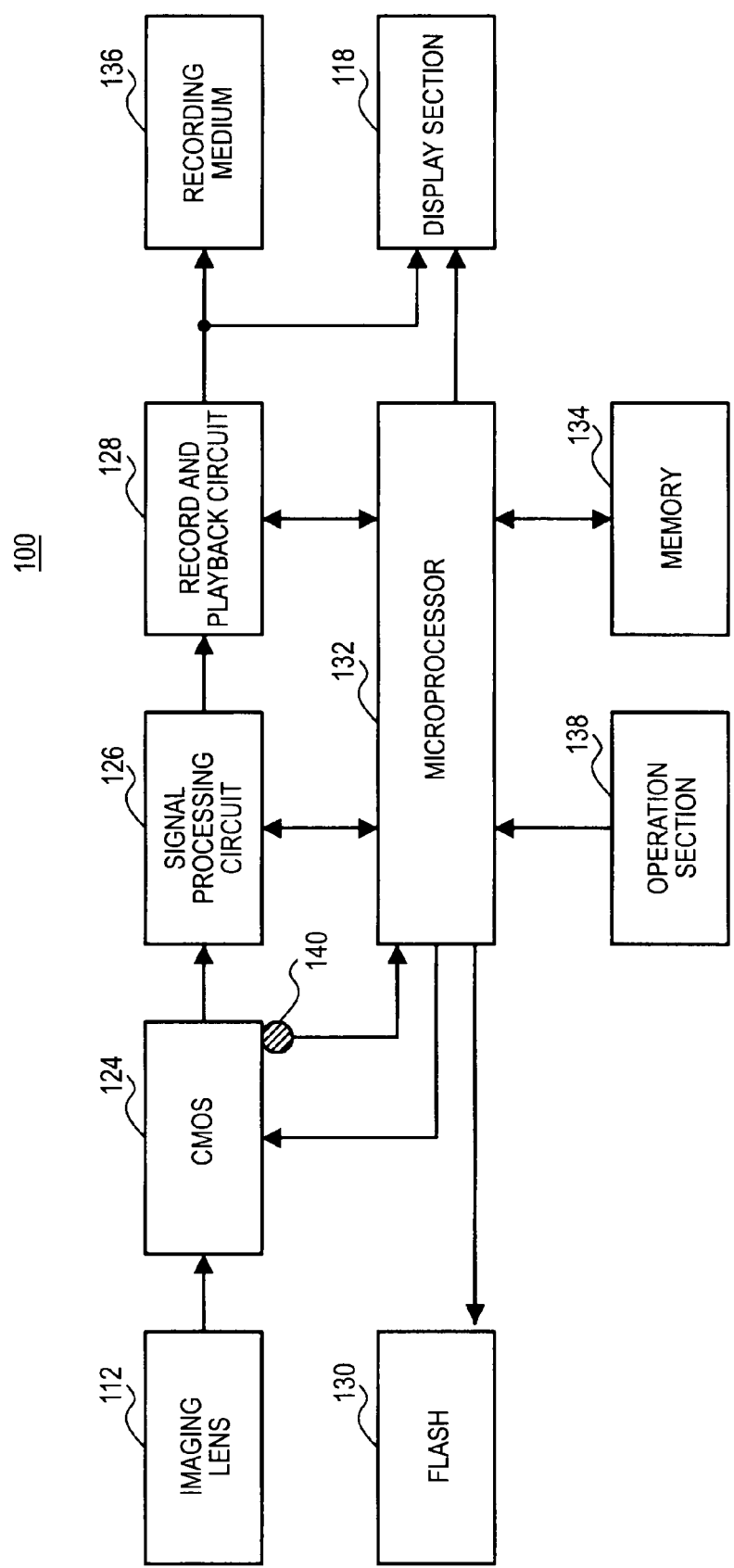
FIG. 3 is a diagram showing a functional configuration of the imaging apparatus according to the embodiment of the present invention.

FIG. 3 is a diagram showing a functional configuration of the imaging apparatus 100 according to the embodiment of the present invention. Hereinafter, the functional configuration of the imaging apparatus 100 according to the embodiment of the present invention will be described with reference to FIG. 3.

As shown in FIG. 3, the imaging apparatus 100 according to the embodiment of the present invention is configured to include the imaging lens 112, the display section 118, the CMOS image sensor 124, a signal processing circuit 126, a record and playback circuit 128, a flash 130, a microprocessor 132, a memory 134, a recording medium 136, an operation section 138, and a temperature measurement section 140.

The imaging lens 112 collects light from a subject when capturing an image using the imaging apparatus 100 and stores the collected light in the imaging apparatus 100. The light collected by the imaging lens 112 is sent to the CMOS image sensor 124.

The CMOS image sensor 124 converts the light collected by the imaging lens 112 into full-color image data (raw data). The RAW data generated by the CMOS image sensor 124 is sent to the signal processing circuit 126. In the embodiment of the present invention, a CCD image sensor may be used instead of the CMOS image sensor 124.

The signal processing circuit 126 performs signal processing on the RAW data generated by the CMOS image sensor 124 to generate image data. The signal processing performed by the signal processing circuit 126 includes demosaic processing, noise removal processing, and compression processing, for example. The image data generated as the result of the signal processing by the signal processing circuit 126 are recorded on the recording medium 136 or displayed on the display section 118 under the control of the record and playback circuit 128.

The record and playback circuit 128 controls the recording of the image data on the recording medium 136, reading of the image data from the recording medium 136, and displaying of the image data on the display section 118.

The flash 130 emits light when capturing an image using the imaging apparatus 100 and irradiating light to a subject. The microprocessor 132 performs control of each section of the imaging apparatus 100. In the present embodiment, the microprocessor 132 calculates the temperature of the casing 110 based on the temperature measured by a temperature measurement section 140 described later and controls the operation of the imaging apparatus 100 based on the calculated temperature of the casing 110 and the temperature measured by the temperature measurement section 140 described later. That is, the microprocessor 132 has the function of an environmental temperature calculation section and an operation control section of the embodiment of the present invention. The memory 134 stores information used for the operation of the imaging apparatus 100. In the memory 134, information such as various settings or time at the time of capturing may be stored. As for the memory 134, a volatile memory may be used, and a nonvolatile memory in which information is not removed even when the imaging apparatus 100 is not powered on may be used.

The recording medium 136 stores images captured with the imaging apparatus 100. The storing of images in the recording medium 136 is controlled by the control of the record and playback circuit 128. Moreover, the images stored in the recording medium 136 may be displayed on the display section 118 by the control of the record and playback circuit 128.

The operation section 138 receives operations on the imaging apparatus 100. In the imaging apparatus 100 according to the present embodiment, the operation section 138 is configured to include the zoom lever 114, the shutter button 115 for starting the capturing of a still image or a moving image, the playback button 116 for displaying captured data stored in the imaging apparatus 100 on the display section 118, and the power button 117 for turning on/off the imaging apparatus 100.

The display section 118 is configured by a liquid crystal panel or an organic EL panel, for example, as described above, and displays images captured with the imaging apparatus 100 and various setting screens of the imaging apparatus 100. The displaying of images on the display section 118 is performed by the control of the microprocessor 132.

The temperature measurement section 140 measures the temperature of the CMOS image sensor 124. As for the temperature measurement section 140, a sensor such as a thermistor capable of measuring the temperature can be used. The temperature of the CMOS image sensor 124 measured by the temperature measurement section 140 is sent to the microprocessor 132. The microprocessor 132 calculates the temperature of an environment where the imaging apparatus 100 is placed based on the temperature of the CMOS image sensor 124 measured by the temperature measurement section 140. Therefore, the microprocessor 132 functions as the environmental temperature calculation section of the embodiment of the present invention, as described above.

Hereinabove, the functional configuration of the imaging apparatus 100 according to the embodiment of the present invention has been described with reference to FIG. 3. Next, the heat dissipation structure of the imaging apparatus 100 according to the embodiment of the present invention will be described.

1-3. Heat Dissipation Structure of Imaging Apparatus

Figure 4:
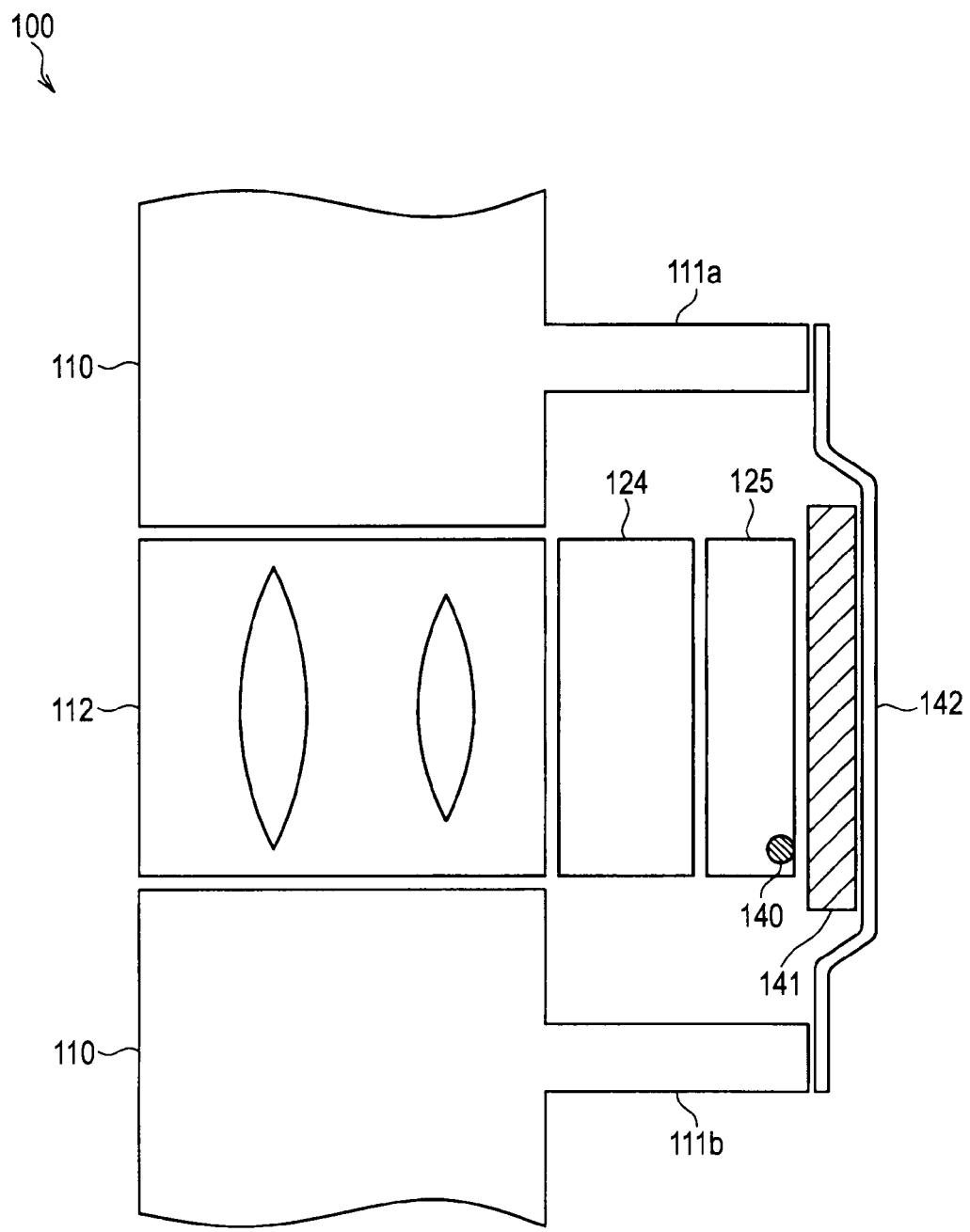
FIG. 4 is a diagram showing a heat dissipation structure of the imaging apparatus according to the embodiment of the present invention.

FIG. 4 is a diagram illustrating the heat dissipation structure of the imaging apparatus 100 according to the embodiment of the present invention. Hereinafter, the heat dissipation structure of the imaging apparatus 100 according to the embodiment of the present invention will be described in detail with reference to FIG. 4.

The imaging apparatus 100 according to the present embodiment has a structure in which the temperature measurement section 140 is provided on a driving substrate 125 for driving the CMOS image sensor 124, and the temperature of the CMOS image sensor 124 is measured by the temperature measurement section 140. Moreover, the imaging apparatus 100 according to the present embodiment has a structure which releases heat of the CMOS image sensor 124 generated with consumption of power by the CMOS image sensor 124 to the casing 110.

As shown in FIG. 4, the imaging apparatus 100 according to the embodiment of the present invention includes a cooling sheet 141 provided on the back surface of the driving substrate 125 in order to release heat emitted by the CMOS image sensor 124 to the casing 110 and a heat sink 142 which is in contact with the cooling sheet 141 and comes in contact with the casing 110 and projections 111a and 111b.

The dissipation of Heat of the CMOS image sensor 124 will be described with reference to FIG. 4. As in the case of capturing a moving image for a long period and displaying the moving image on the display section 118, when the CMOS image sensor 124 is driven continuously, the CMOS image sensor 124 generates heat. The heat generated by the CMOS image sensor 124 is transferred from the driving substrate 125 to the cooling sheet 141 and the heat sink 142 and from the heat sink 142 to the casing 110 through the projections 111a and 111b.

As for the heat sink 142, it is preferable to use a material having high heat conductivity. Examples of a material having high heat conductivity include a metal plate made from a metal, a sheet made from a metal, a flexible substrate, a graphite sheet, and the like. Similarly, as for the casing 110, it is preferable to use a material having high heat conductivity in order to dissipate heat generated by the CMOS image sensor 124.

By providing such a heat dissipation mechanism to the imaging apparatus 100, it is possible to suppress a temperature increase of the CMOS image sensor 124 when the CMOS image sensor 124 is continuously driven as in the case of capturing a moving image of a long period and displaying the moving image on the display section 118 and suppress the occurrence of noise in the captured data.

In the imaging apparatus 100 according to the embodiment of the present invention, since the temperature measurement section 140 is provided on the driving substrate 125, it is possible to acquire the absolute temperature of the CMOS image sensor 124 using the temperature measurement section 140 provided on the driving substrate 125. Moreover, when the absolute temperature of the CMOS image sensor 124 exceeds a predetermined temperature, a predetermined warning signal is issued by the microprocessor 132 or the function of the imaging apparatus is stopped, whereby the temperature increase of the CMOS image sensor 124 can be prevented.

However, as shown in FIG. 4, when the heat dissipation structure which releases heat of the CMOS image sensor 124 to the casing 110 is used, there is a possibility that the user of the imaging apparatus 100 feels hot when the casing 110 is held in the user's hand or the user receives a burn (a low-temperature burn) due to an increase in the absolute temperature of the casing 110. Therefore, it is necessary to pay attention to the increase in the absolute temperature of the casing 110 as well as the absolute temperature of the CMOS image sensor 124. However, as described above, the discomfort experienced by the user of the imaging apparatus 100 results from the temperature of the casing 110 relative to the use environment of the imaging apparatus 100 rather than from the absolute temperature of the casing 110. Therefore, it would be best to be able to measure the temperature of the use environment of the imaging apparatus 100. However, providing a device for measuring the temperature of the use environment of the imaging apparatus 100 in addition to a device for measuring the absolute temperature of the CMOS image sensor 124 has a problem in that it results in an increase in costs.

Figure 5:
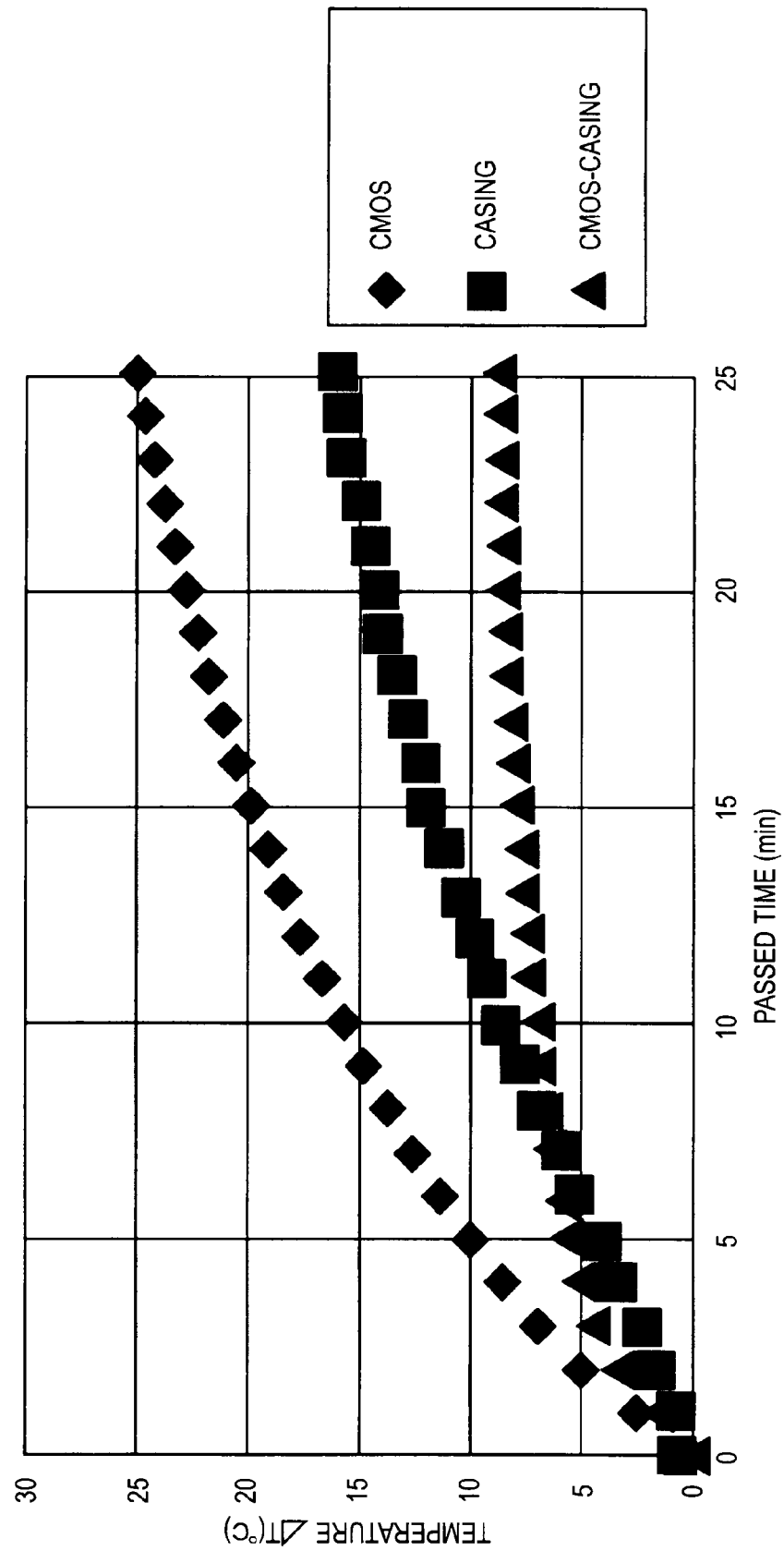
FIG. 5 is a graphic diagram showing the relationship between a temperature increase of a CMOS image sensor and a temperature increase of a casing.

Here, since the heat dissipation structure of the CMOS image sensor 124 as shown in FIG. 4 is used, the temperature increase of the CMOS image sensor 124 has a predetermined correlation with the temperature increase of the casing 110. FIG. 5 is a graphic diagram showing the relationship between the temperature increase of the CMOS image sensor 124 and the temperature increase of the casing 110. As shown in FIG. 5, the temperature of the casing 110 increases with the temperature increase of the CMOS image sensor 124.

Therefore, in the imaging apparatus 100 according to the embodiment of the present invention, the temperature (environmental temperature) of an environment where the casing 110 is placed is calculated from a change in the absolute temperature of the CMOS image sensor 124 measured by the temperature measurement section 140. By calculating the environmental temperature as described above, when a difference between the calculated environmental temperature and the absolute temperature of the CMOS image sensor 124 measured by the temperature measurement section 140 exceeds a predetermined value, it is possible to allow the microprocessor 132 to issue a predetermined warning signal or stop the function of the imaging apparatus.

Hereinafter, a method of calculating the environmental temperature from the change in the absolute temperature of the CMOS image sensor 124 measured by the temperature measurement section 140 will be described.

1-4. Calculation Method of Environmental Temperature

When the amount of heat generation from the CMOS image sensor 124 which is a heat generation source is constant, the temperature of the casing 110 changes with the temperature difference between the environmental temperature and the temperature of the casing 110 regardless of the absolute value of the environmental temperature. A case where the amount of heat generation from the CMOS image sensor 124 which is a heat generation source is constant corresponds to the time when a moving image is captured using the CMOS image sensor 124, for example.

Therefore, in the present embodiment, the relationship between (1) the temperature difference between the environmental temperature and the temperature of the casing 110 and (2) the increase in the casing temperature with the passage of time is measured in advance, and the measurement results are stored in the memory 134. As will be described below, the relationship between (1) the temperature difference between the environmental temperature and the temperature of the casing 110 and (2) the increase in the casing temperature with the passage of time can be approximated to a linear relation. Thus, it is possible to calculate the environmental temperature from a change in the temperature of the CMOS image sensor 124, that is, from a change in the temperature of the casing 110.

Figure 6:
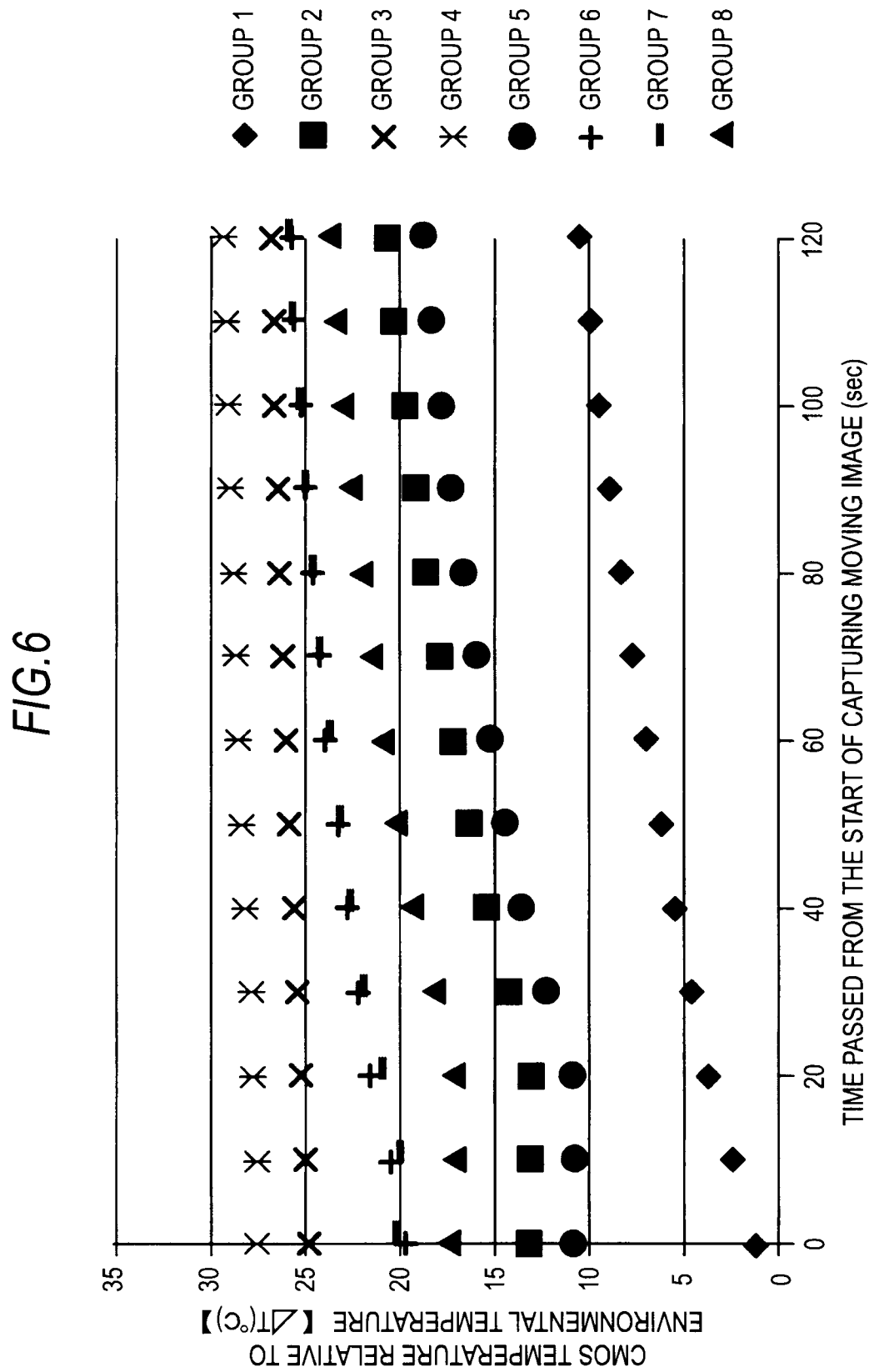
FIG. 6 a graphic diagram showing the relationship between the period passed from the start of capturing of a moving image with the imaging apparatus and the change in the difference of the temperature of the CMOS image sensor from an environmental temperature.

FIG. 6 is a graphic diagram showing the relationship between the time which has passed from the start of the capturing of a moving image with the imaging apparatus 100 and the change in the temperature difference of the CMOS image sensor 124 from the environmental temperature. The graph shown in FIG. 5 is obtained by plotting the aspects of the temperature increase while changing the conditions of the difference of the temperature of the CMOS image sensor 124 from the environmental temperature at the point in time when the imaging apparatus 100 starts capturing a moving image. As shown in FIG. 6, when there is almost no difference between the temperature of the CMOS image sensor 124 and the environmental temperature at the point in time when the imaging apparatus 100 starts capturing a moving image, the difference between the temperature of the CMOS image sensor 124 and the environmental temperature is about 10.5° C. after the passage of 2 minutes (120 seconds). Moreover, when the difference between the temperature of the CMOS image sensor 124 and the environmental temperature at the point in time when the imaging apparatus 100 starts capturing a moving image is 25° C. or more, there is a small temperature increase of the CMOS image sensor 124 for 2 minutes.

Figure 7:
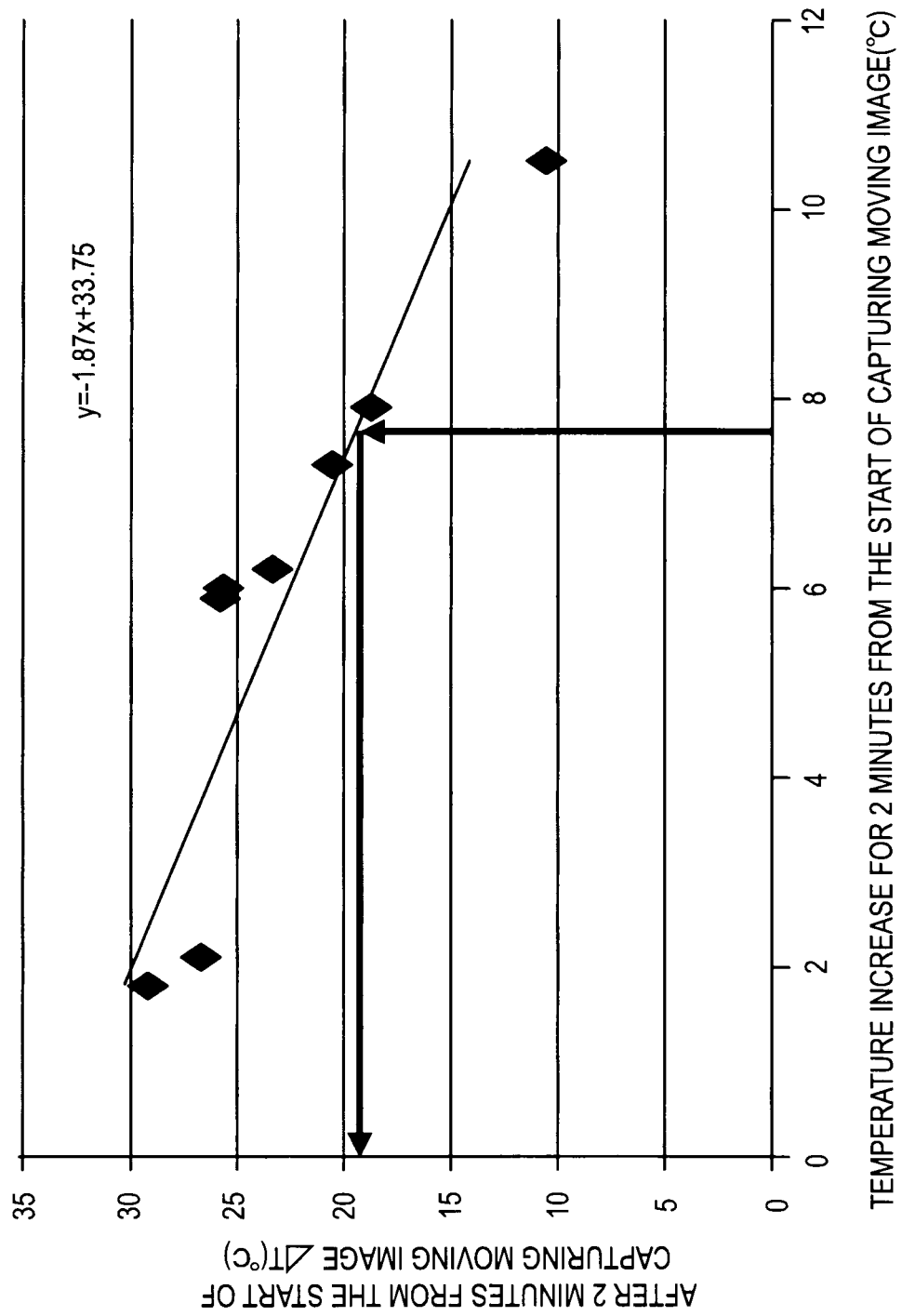
FIG. 7 is a graphic diagram showing the relationship between a change in the difference of the temperature of the CMOS image sensor and a difference of the temperature of the CMOS image sensor from the environmental temperature.

The relationship between the change in the difference in the temperature of the CMOS image sensor 124 after the passage of 2 minutes from the start of the capturing of a moving image with the imaging apparatus 100 and the difference between the temperature of the CMOS image sensor 124 and the environmental temperature after the passage of 2 minutes from the start of the capturing of a moving image with the imaging apparatus 100 can be approximated to a linear relation. FIG. 7 is a graphic diagram showing the relationship between the change in the difference between the temperature of the CMOS image sensor 124 and the environmental temperature for 2 minutes after the start of the capturing of a moving image with the imaging apparatus 100 and the difference between the temperature of the CMOS image sensor 124 and the environmental temperature after the passage of 2 minutes from the start of the capturing of a moving image with the imaging apparatus 100. In the graph shown in FIG. 7, the horizontal axis represents the amount of change in the difference between the temperature of the CMOS image sensor 124 and the environmental temperature for 2 minutes after the start of the capturing of a moving image with the imaging apparatus 100. The vertical axis represents the difference between the temperature of the CMOS image sensor 124 and the environmental temperature after the passage of 2 minutes after the start of the capturing of a moving image with the imaging apparatus 100. Moreover, the respective points in the graph of FIG. 7 are obtained by plotting the amount of temperature increase of the respective groups shown in FIG. 6.

As can be understood from FIG. 7, the relationship between the temperature increase of the CMOS image sensor 124 and the difference between the temperature of the CMOS image sensor 124 and the environmental temperature after the passage of 2 minutes from the start of the capturing of a moving image with the imaging apparatus 100 can be approximated to a predetermined linear function. Therefore, by storing information about the linear function in advance in the memory 134, calculating a difference between the temperature of the CMOS image sensor 124 at the point in time when the imaging apparatus 100 starts capturing a moving image and the temperature of the CMOS image sensor 124 after the passage of 2 minutes from the start of the capturing of a moving image, and substituting the calculated temperature difference in the approximated linear function, the difference between the temperature of the CMOS image sensor 124 and the environmental temperature after the passage of 2 minutes from the start of the capturing of a moving image with the imaging apparatus 100 is obtained. By subtracting the temperature difference calculated as described above from the temperature of the CMOS image sensor 124 after the passage of 2 minutes from the start of the capturing of a moving image, it is possible to estimate and calculate the environmental temperature of the imaging apparatus 100.

In the example shown in FIG. 7, the relationship between the temperature increase x of the CMOS image sensor 124 and the temperature difference y between the temperature of the CMOS image sensor 124 and the environmental temperature after the passage of 2 minutes from the start of the capturing of a moving image with the imaging apparatus 100 can be approximated to the following equation.

$$y = -1.87x + 33.75 \quad (1)$$

Therefore, by substituting the amount of temperature increase of the CMOS image sensor 124 for 2 minutes in the equation 1, it is possible to calculate the difference between the temperature of the CMOS image sensor 124 and the environmental temperature after the passage of 2 minutes from the start of the capturing of a moving image with the imaging apparatus 100.

Figure 8:
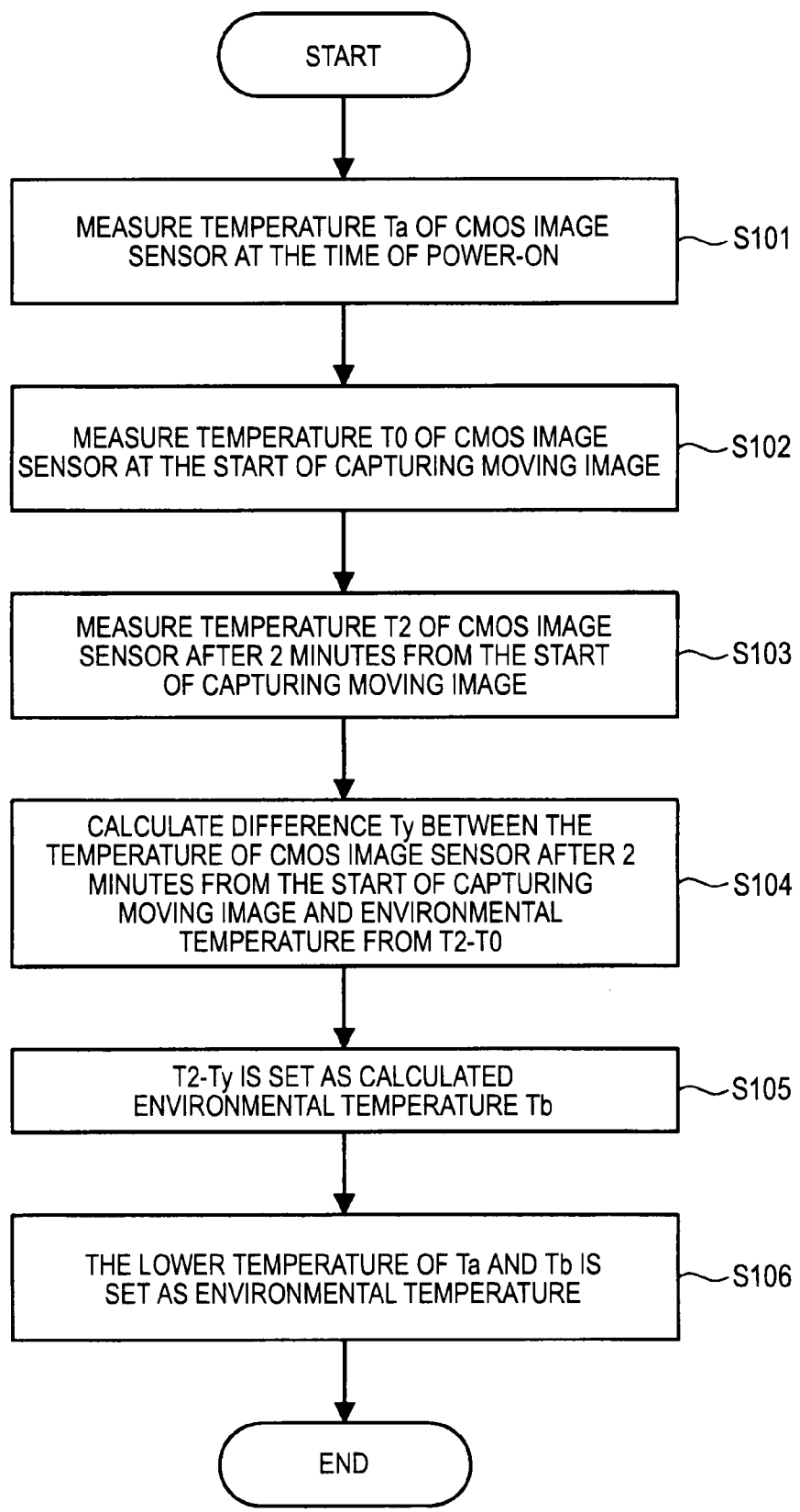
FIG. 8 is a flowchart showing a method of calculating the environmental temperature using the imaging apparatus according to the embodiment of the present invention.

Next, a method of calculating the environmental temperature using the imaging apparatus 100 according to the present embodiment will be described in detail. FIG. 8 is a flowchart showing a method of calculating the environmental temperature using the imaging apparatus 100 according to the embodiment of the present invention. Hereinafter, the method of calculating the environmental temperature using the imaging apparatus 100 according to the present embodiment will be described in detail with reference to FIG. 8.

First, the microprocessor 132 acquires the temperature Ta of the CMOS image sensor 124 using the temperature measurement section 140 at the point in time when the imaging apparatus 100 is turned on (step S101). Information on the acquired temperature Ta is held in the memory 134 by the microprocessor 132. When the imaging apparatus 100 has not been used for a long period, for example, this temperature Ta can be regarded as the environmental temperature of the imaging apparatus 100, and is a temperature that is appropriately used as a virtual environmental temperature.

When the temperature Ta of the CMOS image sensor 124 at the point in time when the imaging apparatus 100 is turned on is acquired by the temperature measurement section 140, the microprocessor 132 waits until the user of the imaging apparatus 100 starts an operation of capturing a moving image. When the user of the imaging apparatus 100 starts the operation of capturing a moving image, the microprocessor 132 acquires the temperature T0 of the CMOS image sensor 124 at the point in time when the operation of capturing a moving image starts using the temperature measurement section 140 (step S102).

Subsequently, the microprocessor 132 acquires the temperature T2 of the CMOS image sensor 124 after the passage of 2 minutes from the start of the moving image capturing operation using the temperature measurement section 140 (step S103). When the moving image capturing operation using the imaging apparatus 100 has ended in less than 2 minutes, the microprocessor 132 does not measure the temperature T2.

In the present embodiment, although the environmental temperature is calculated by acquiring the temperature T2 of the CMOS image sensor 124 after the passage of 2 minutes from the start of the moving image capturing operation using the temperature measurement section 140, the present invention is not limited to this example.

Subsequently, when the temperatures T0 and T2 are acquired, the microprocessor 132 calculates (T2−T0) and substitutes the calculated value into a linear function stored in advance in the memory 134, thus calculating a difference Ty between the temperature of the CMOS image sensor 124 after the passage of 2 minutes from the start of the capturing of a moving image and the environmental temperature (step S104).

Subsequently, when the difference Ty between the temperature of the CMOS image sensor 124 after the passage of 2 minutes from the start of the capturing of a moving image and the environmental temperature is calculated, the microprocessor 132 obtains a value by subtracting the temperature difference Ty from the temperature T2 and uses the obtained value as a calculated environmental temperature Tb (step S105).

For example, it is assumed that the temperature T0 of the CMOS image sensor 124 at the point in time when the moving image capturing operation is started is 35.8[° C.], and the temperature T2 of the CMOS image sensor 124 after the passage of 2 minutes from the start of the moving image capturing operation is 43.7[° C.]. Since T2−T0=7.9[° C.], when 7.9 is substituted into x of the equation 1, the value of y will be y=19.0. Therefore, in this case, the difference Ty between the temperature of the CMOS image sensor 124 after the passage of 2 minutes from the start of the moving image capturing operation and the environmental temperature will be Ty=19.0[° C.]. Moreover, the calculated environmental temperature Tb will be T2−Ty=43.7−19.0=24.7[° C.].

Finally, the microprocessor 132 selects the lower temperature of the temperature Ta of the CMOS image sensor 124 at the point in time when the imaging apparatus 100 is turned on, acquired in step S101 and the calculated environmental temperature Tb calculated in step S105, uses the selected temperature as the environmental temperature, and stores the environmental temperature in the memory 134 (step S106). For example, when the temperature Ta is 25.0[° C.] and the temperature Tb is 24.7[° C.], the microprocessor 132 stores the temperature Tb in the memory 134 as the environmental temperature of the imaging apparatus 100. Moreover, the microprocessor 132 executes an operation of monitoring the temperature of the CMOS image sensor 124 using the environmental temperature stored in the memory 134.

Hereinabove, the method of calculating the environmental temperature using the imaging apparatus 100 according to the present embodiment has been described with reference to FIG. 8. Next, a temperature monitoring operation of the CMOS image sensor 124 using the environmental temperature calculated as described above will be described.

1-5. Temperature Monitoring Process of CMOS Image Sensor

Figure 9:
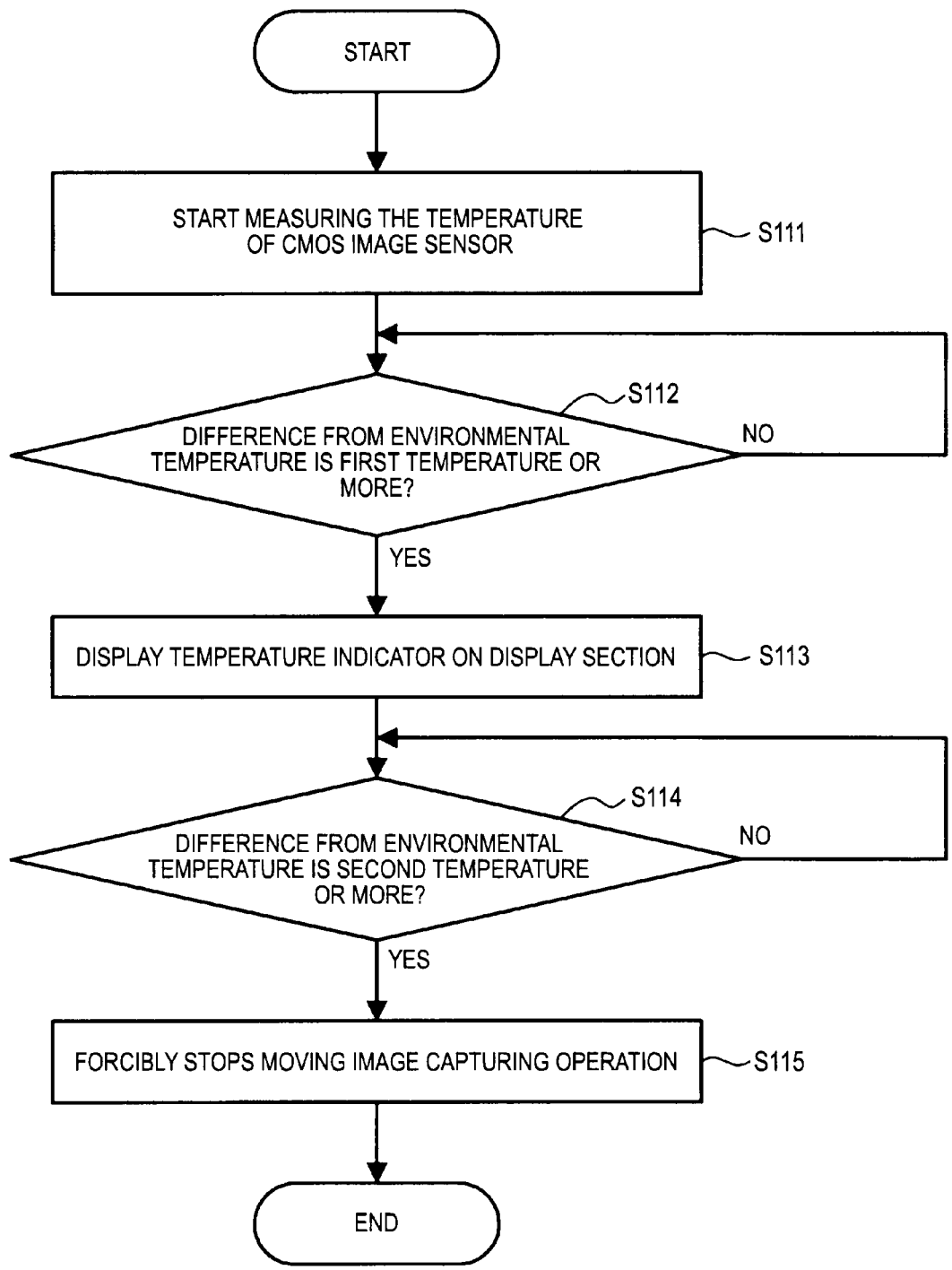
FIG. 9 is a flowchart showing a temperature monitoring operation of the CMOS image sensor according to an embodiment of the present invention.

FIG. 9 is a flowchart showing a temperature monitoring operation of the CMOS image sensor 124 according to an embodiment of the present invention. Hereinafter, the temperature monitoring operation of the CMOS image sensor 124 will be described in detail with reference to FIG. 9. The temperature monitoring operation of the CMOS image sensor 124 shown in FIG. 9 is performed in a state where the environmental temperature is calculated in accordance with the method of calculating the environmental temperature using the imaging apparatus 100 shown in FIG. 8.

First, the temperature measurement section 140 starts measuring the temperature of the CMOS image sensor 124 (step S111). Then, the microprocessor 132 monitors the temperature of the CMOS image sensor 124 acquired by the temperature measurement section 140 and determines whether or not a temperature difference between the environmental temperature calculated in accordance with the method of calculating the environmental temperature using the imaging apparatus 100 and the temperature of the CMOS image sensor 124 measured by the temperature measurement section 140 has reached a predetermined first temperature (for example, 25° C.) or more (step S112).

When the temperature difference between the environmental temperature and the temperature of the CMOS image sensor 124 has not reached the predetermined first temperature, the microprocessor 132 continues monitoring the temperature of the CMOS image sensor 124 acquired by the temperature measurement section 140. On the other hand, when the temperature difference between the environmental temperature and the temperature of the CMOS image sensor 124 has reached the predetermined first temperature or more, the microprocessor 132 issues a predetermined warning signal indicating that the temperature of the CMOS image sensor 124 has increased, for example by displaying information on the temperature of the CMOS image sensor 124 on the display section 118 (step S113). The predetermined warning signal is not limited to the displaying of the temperature information of the CMOS image sensor 124 on the display section 118. For example, the predetermined warning signal may be displaying a message indicating that the temperature of the CMOS image sensor 124 has increased on the display section 118 to be overlapped on a captured image.

Figure 10:
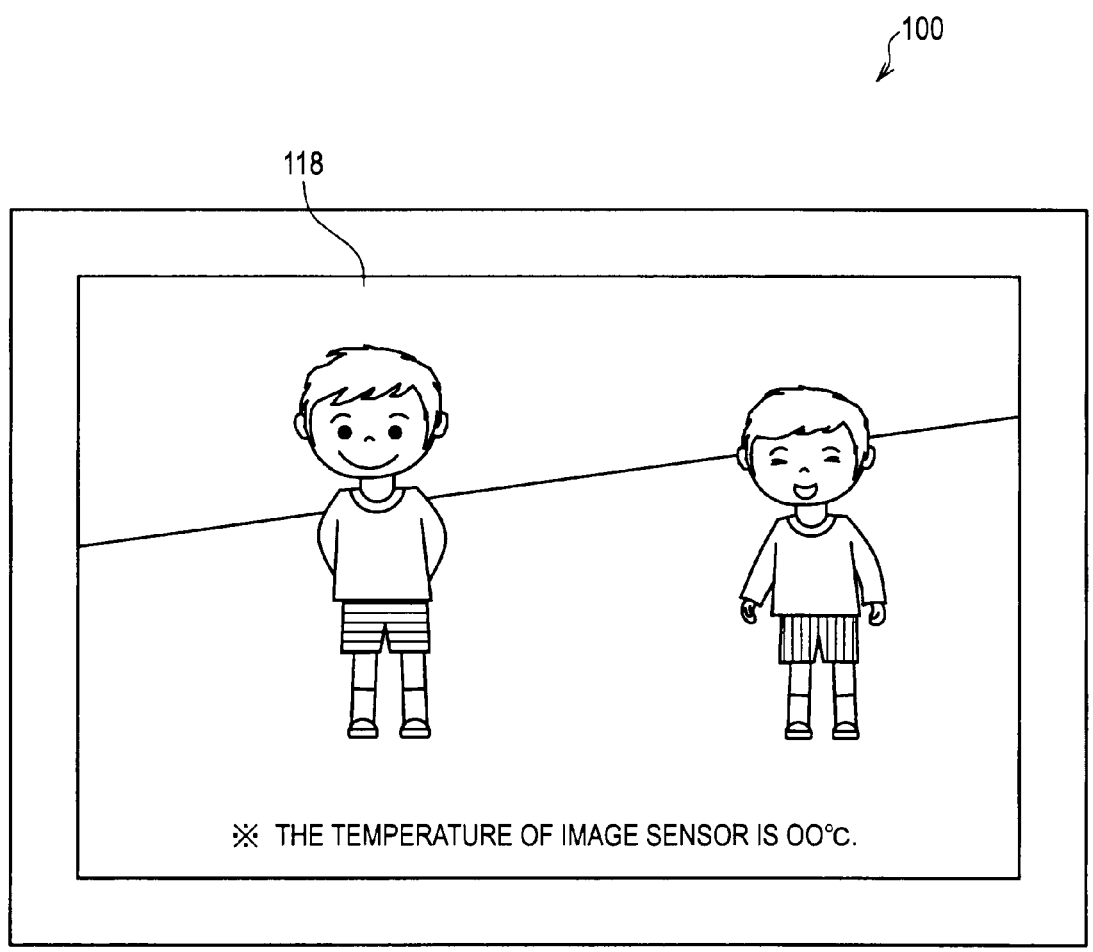
FIG. 10 is a diagram showing an example of a temperature indicator displayed on a display section.

FIG. 10 is a diagram showing an example of a temperature indicator displayed on the display section 118 when the temperature difference between the environmental temperature and the temperature of the CMOS image sensor 124 has reached the predetermined first temperature or more. In this way, by allowing the microprocessor 132 to display the temperature information of the CMOS image sensor 124 on the display section 118 in the form of a temperature indicator, the user of the imaging apparatus 100 can be informed of the fact that the temperature of the CMOS image sensor 124 is increasing.

Even after the temperature difference between the environmental temperature and the temperature of the CMOS image sensor 124 has reached the predetermined first temperature or more, the microprocessor 132 determines whether or not the temperature of the CMOS image sensor 124 has increased and the temperature difference between the environmental temperature and the temperature of the CMOS image sensor 124 measured by the temperature measurement section 140 has reached a predetermined second temperature (for example, 30° C.) or more which is higher than the predetermined first temperature (step S114).

When the temperature difference between the environmental temperature and the temperature of the CMOS image sensor 124 has not reached the predetermined second temperature or more, the microprocessor 132 continues monitoring the temperature of the CMOS image sensor 124 acquired by the temperature measurement section 140. On the other hand, when the temperature difference between the environmental temperature and the temperature of the CMOS image sensor 124 reaches the predetermined second temperature or more, there is a possibility that a further increase in the temperature of the CMOS image sensor 124 increases noise and affects the captured image, and the user of the imaging apparatus 100 has a low-temperature burn due to the temperature increase of the casing 110 to which the heat of the CMOS image sensor 124 is transferred. Therefore, the microprocessor 132 stops the supply of power to the CMOS image sensor 124 to forcibly stop the moving image capturing operation (step S115).

In the present embodiment, after the moving image capturing operation is forcibly stopped when the temperature difference between the environmental temperature and the temperature of the CMOS image sensor 124 has reached the predetermined second temperature or more, the operation mode of the imaging apparatus 100 may transition to an operation mode where the power consumption of the CMOS image sensor 124 is small. For example, the low power consumption mode may be a live-view display mode of the display section 118 since the power consumption of the CMOS image sensor 124 in the live-view display mode is smaller than the moving image capturing mode. Moreover, the imaging apparatus 100 may be forcibly turned off.

Hereinabove, the temperature monitoring operation of the CMOS image sensor 124 has been described with reference to FIG. 9. In this way, by the microprocessor 132 executing the temperature monitoring operation of the CMOS image sensor, it is possible to suppress the occurrence of noise in the captured image resulting from the temperature increase of the CMOS image sensor 124 and suppress the temperature increase of the casing 110, thus preventing the user of the imaging apparatus 100 from experiencing discomfort or receiving a low-temperature burn.

The series of processings described in the respective embodiments can be executed not only by special-purpose hardware but also by software. When the series of processings is executed by software, a general-purpose or special-purpose computer 900 as shown in FIG. 11 executes a program, whereby the series of processings can be realized.

Figure 11:
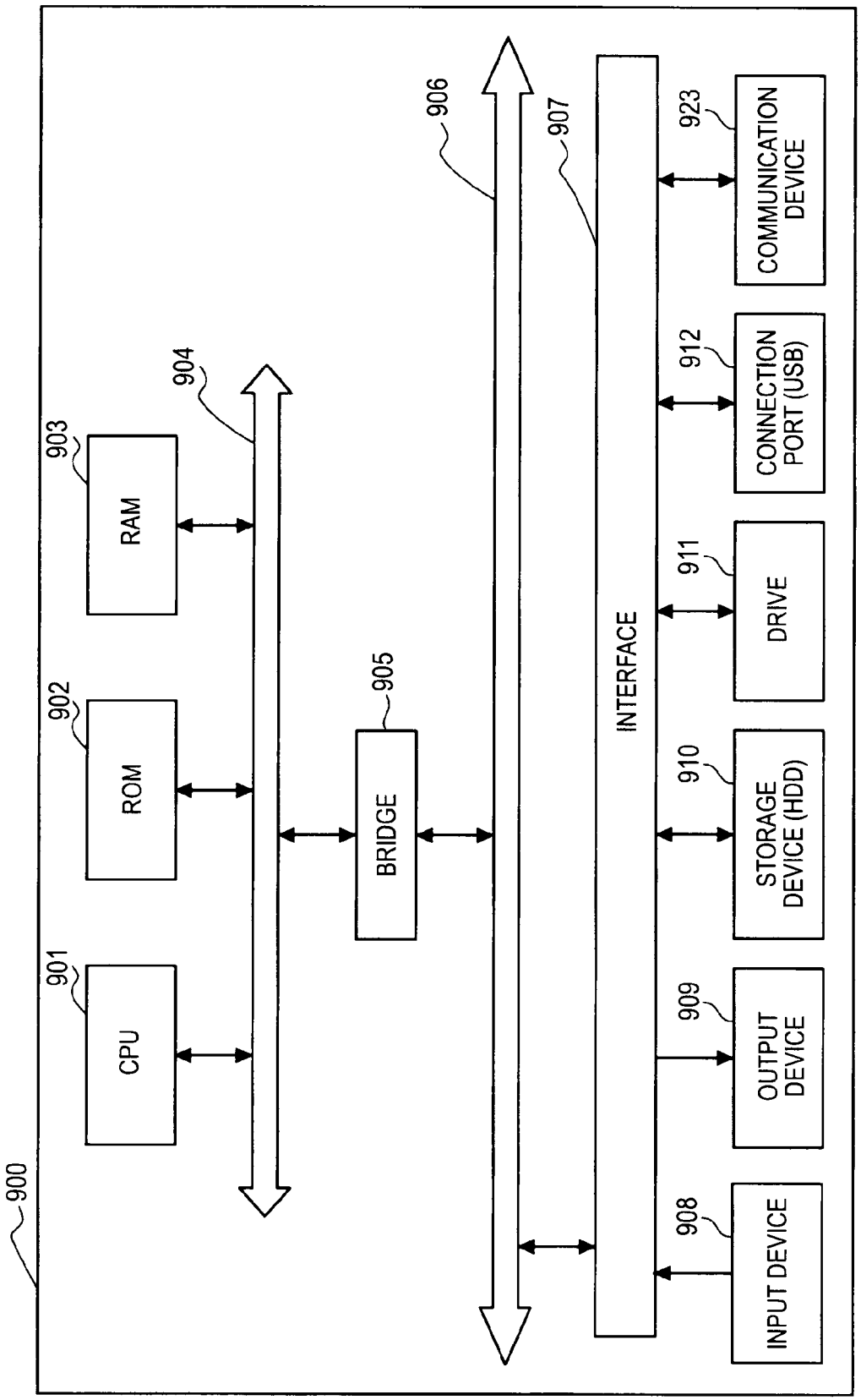
FIG. 11 is a diagram illustrating a configuration example of a computer which implements a series of processings by executing a program.

FIG. 11 is a diagram illustrating a configuration example of the computer 900 which implements a series of processings by executing a program. Hereinafter, the execution of the program for performing the series of processings by the computer 900 will be described.

As shown in FIG. 11, the computer 900 includes a CPU (Central Processing Unit) 901, a ROM (Read Only Memory) 902, a RAM (Random Access Memory) 903, buses 904 and 906, a bridge 905, an interface 907, an input device 908, an output device 909, a storage device 910 (for example, a HDD), a drive 911, a connection port (for example, USB) 912, and a communication device 913, for example. These respective configurations are connected to each other through the buses 904 and 906 connected by the bridge 905, the interface 907, or the like so that information can be transmitted therebetween.

The program can be recorded in the storage device 910 such as a HDD (Hard Disk Drive) or a SSD (Solid State Drive), which is an example of a recording device, the ROM 902, the RAM 903, and the like.

Moreover, the program may be recorded temporarily or permanently on a magnetic disk (such as a flexible disk), an optical disk (such as a CD (compact disc), a MO (magneto optical) disc, or a DVD (digital versatile disc)), and a removable storage medium (not shown) (such as a semiconductor memory), for example. Such a removable storage medium may be provided as so-called package software. The program recorded on such a removable storage medium may be read by the drive 911 and recorded in the above-described recording device through the interface 907, the buses 904 and 906, and the like.

Furthermore, the program may be recorded, for example, in a download site, other computers, other recording devices (not shown), and the like. In this case, the program is transmitted through a network (not shown) such as a LAN (Local Area Network) or the Internet, and the program is received by the communication device 913. Moreover, the program may be transmitted from other recording devices or communication devices connected to the connection port 912 such as a USB (Universal Serial Bus). The program received by the communication device 913 or the connection port 912 may be recorded in the above-described recording device through the interface 907, the buses 904 and 906, and the like.

Then, the CPU 901 executes various kinds of processing in accordance with the program recorded in the recording device, whereby the above-described series of processings are realized. At that time, the CPU 901 may read the program directly from the recording device, for example, and execute the program, and may load the program temporarily in the RAM 903 and execute the program. Furthermore, when the program is received through the communication device 913 or the drive 911, for example, the CPU 901 may directly execute the program without recording the received program in the recording device.

Furthermore, the CPU 901 may perform various kinds of processing based on signals or information input from the input device 908 such as a mouse, a keyboard, or a microphone (not shown) or other input devices connected to the connection port 912 as necessary.

Moreover, the CPU 901 may output the results of the execution of the series of processings from the output device 909 such as a display device (for example, a monitor) or an audio output device (such as a speaker or a headphone), for example. Furthermore, the CPU 901 may transmit the processing results from the communication device 913 or the connection port 912 and may record the processing results in the recording device or the removable storage medium as necessary.

In this specification, the steps described in the flowchart include not only processings which are executed in a time-sequential manner in accordance with described procedures but also processings which are executed in parallel and/or separately even if they are not always executed in a time-sequential manner.

2. Conclusion

As described above, according to the embodiment of the present invention, when the CMOS image sensor 124 continuously consumes a predetermined amount of power as in the case of capturing a moving image, by substituting the amount of temperature increase of the CMOS image sensor for a predetermined period in the relationship held in advance in the memory 134, between the temperature increase x of the CMOS image sensor 124 and the temperature difference y between the temperature of the CMOS image sensor 124 and the environmental temperature after the passage of a predetermined period from the start of consumption of a predetermined amount of power by the CMOS image sensor 124, it is possible to calculate the difference between the temperature of the CMOS image sensor 124 and the environmental temperature. Moreover, it is possible to calculate the environmental temperature by subtracting the difference between the temperature of the CMOS image sensor 124 and the environmental temperature from the temperature of the CMOS image sensor 124.

Moreover, when the difference between the environmental temperature calculated in this way and the temperature of the CMOS image sensor 124 has reached the predetermined value or more, the temperature information is displayed on the display section 118. Thus, it is possible to issue a warning signal to the user of the imaging apparatus 100 indicating that the temperature of the CMOS image sensor 124 has increased. When the temperature difference increases further, the supply of power to the CMOS image sensor 124 is suppressed or stopped. Thus, it is possible to suppress the occurrence of noise in the captured image resulting from the temperature increase of the CMOS image sensor 124 or prevent the user of the imaging apparatus 100 from receiving a low-temperature burn.

Although in the embodiments described above, the imaging apparatus 100 has been described and illustrated as an example of the electronic apparatus of the present invention, the present invention is not limited to such an example. The present invention can be applied to an overall electronic apparatus in which a component (for example, a CPU) which generates heat in response to the supply of electricity is provided.

While preferred embodiments of the present invention have been described in detail with reference to the accompanying drawings, the present invention is not limited to the embodiments. Those skilled in the art will readily appreciate that various modifications and changes may be made in the embodiment without departing from the technical spirit as described in the claims. Accordingly, all such modifications and changes are intended to be included within the scope of the present invention as defined in the claims.

For example, the predetermined first and second temperatures may be changed in accordance with the environmental temperature calculated using the method of calculating the environmental temperature using the imaging apparatus 100 shown in FIG. 8. This is because the temperature of the casing 110 which the user of the imaging apparatus 100 feels as hot when holding the imaging apparatus 100 in the hand depends on the environmental temperature. Therefore, by changing the predetermined first and second temperatures in accordance with the environmental temperature, a more flexible temperature monitoring operation of the CMOS image sensor 124 is made possible.

In addition, in the embodiments described above, the temperature measurement section 140 is provided on the driving substrate 125 for driving the CMOS image sensor 124 so as to measure the temperature of the CMOS image sensor 124. However, the present invention is not limited to such an example. For example, a temperature sensor capable of measuring the temperature of the CMOS image sensor 124 may be included in the CMOS image sensor 124 at the time of manufacturing, and the temperature of the CMOS image sensor 124 may be measured using the temperature sensor.

In addition, in the heat dissipation structure of the imaging apparatus 100 according to the embodiment of the present invention shown in FIG. 4, when it is possible to provide a substrate (for example, a flexible substrate) so as to be in contact with a portion (for example, the heat sink 142 or the projections 111a and 111b) of the heat dissipation structure to which the heat of the CMOS image sensor 124 is transferred, a temperature sensor may be provided on the substrate. By providing the temperature sensor in such a position, it is possible to detect a change in the temperature of the CMOS image sensor 124 and calculate the environmental temperature.

The present invention can be applied to an electronic apparatus and a method of controlling the electronic apparatus, and more particularly, to a portable electronic apparatus such as a digital camera, a portable phone, or a portable audio player, and a method of controlling such an electronic apparatus.

The present application contains subject matter related to that disclosed in Japanese Priority Patent Application JP 2010-039183 filed in the Japan Patent Office on Feb. 24, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus comprising:
a temperature measurement section that measures a first temperature of one of a heat generation source that generates heat by consuming power or an inner portion of a casing, wherein the inner portion of the casing is caused to change temperature due to the heat generated by the heat generation source; and
an environmental temperature calculation section that calculates an environmental temperature in an environment where the casing is placed, wherein the environmental temperature is calculated using a predetermined relational equation from a difference between the first temperature measured at a point in time when the heat generation source starts consuming a predetermined amount of power and a second temperature measured after the passage of a predetermined period from the start of consumption of the predetermined amount of power.

2. The electronic apparatus according to claim 1, further comprising an operation control section that outputs a warning signal when a difference between the environmental temperature calculated by the environmental temperature calculation section and the first temperature measured by the temperature measurement section exceeds a first predetermined value.

3. The electronic apparatus according to claim 2, wherein the operation control section stops supply of power to the heat generation source when the difference between the environmental temperature and the first temperature exceeds a second predetermined value greater than the first predetermined value.

4. The electronic apparatus according to claim 1, wherein the temperature measurement section is in direct contact with the heat generation source.

5. The electronic apparatus according to claim 1, wherein the temperature measurement section is provided on a substrate which is in contact with the heat generation source so as to drive the heat generation source.

6. The electronic apparatus according to claim 1, wherein the heat generation source is an imaging device.

7. A method of controlling an electronic apparatus, comprising:
measuring a first temperature of one of a heat generation source generating heat by consuming power or an inner portion of a casing which changes temperature due to the heat generated by the heat generation source at a point in time when the heat generation source starts consuming a predetermined amount of power;
measuring a second temperature of one of the heat generation source or the inner portion of the casing after the passage of a predetermined period from the start of consumption of the predetermined amount of power by the heat generation source;
calculating an environmental temperature using a predetermined relational equation from a difference between the first temperature and the second temperature in an environment where the casing is placed; and
measuring a third temperature of one of the heat generation source or the inner portion of the casing when the electronic apparatus is turned on, wherein a lower temperature of the third temperature and the environmental temperature calculated using the predetermined relational equation is selected, and wherein the selected temperature is used as the environmental temperature.

8. The method according to claim 7, further comprising outputting a warning signal when a difference between the environmental temperature and the first temperature of the heat generation source or the inner portion of the casing exceeds a first predetermined value.

9. The method according to claim 8, wherein, when the difference between the environmental temperature and the first temperature of the heat generation source or the inner portion of the casing exceeds a second predetermined value greater than the first predetermined value, supply of power to the heat generation source is stopped.

10. An electronic apparatus comprising:
a temperature measurement section that measures a first temperature of one of a heat generation source that generates heat by consuming power or an inner portion of a casing which is caused to change temperature due to the heat generated by the heat generation source; and
an environmental temperature calculation section that calculates an environmental temperature in an environment where the casing is placed, wherein the environmental temperature is calculated using a predetermined relational equation from a difference between the first temperature measured at a point in time when the heat generation source starts consuming a predetermined amount of power and a second temperature measured after the passage of a predetermined period from the start of consumption of the predetermined amount of power, wherein the environmental temperature calculation section holds a third temperature measured by the temperature measurement section at a point in time when the electronic apparatus is turned on, selects the lower temperature of the third temperature and the environmental temperature calculated using the predetermined relational equation, and uses the selected temperature as the environmental temperature.

* * * * *